UNITED STATES PATENT OFFICE.

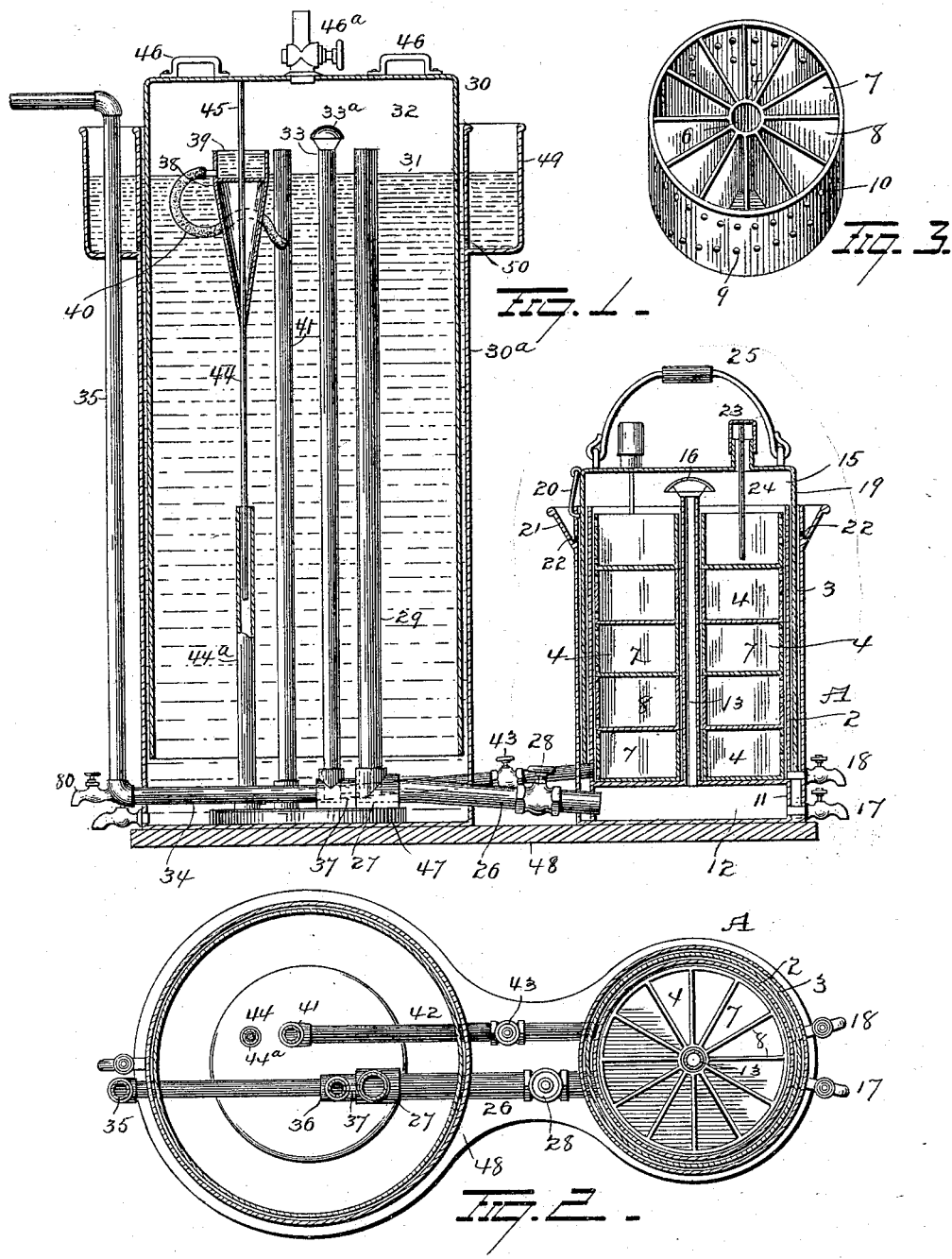

JAMES J. FAULKNER, OF MEMPHIS, TENNESSEE, ASSIGNOR, BY DIRECT AND MESNE ASSIGNMENTS, TO THE STANDARD GAS MACHINE COMPANY, OF SAME PLACE.

ACETYLENE-GAS APPARATUS.

SPECIFICATION forming part of Letters Patent No. 624,469, dated May 9, 1899.

Application filed October 6, 1898. Serial No. 692,820. (No model.)

*To all whom it may concern:*

Be it known that I, JAMES J. FAULKNER, of Memphis, in the county of Shelby and State of Tennessee, have invented certain new and useful Improvements in Apparatus for Manufacturing Acetylene Gas; and I do hereby declare the following to be a full, clear, and exact description of the invention, such as will enable others skilled in the art to which it appertains to make and use the same.

My invention relates to an improvement in apparatus for manufacturing acetylene gas; and it consists in certain novel features of construction and combinations of parts, as will be hereinafter more fully described, and pointed out in the claims.

In the accompanying drawings, Figure 1 represents a view in vertical section through my improved apparatus. Fig. 2 is a horizontal perspective view; Fig. 3, a sectional view of the carbid-receptacles.

A represents the generator of my improved apparatus, and B the receiver thereof. The generator A consists of an outer cylinder 1, open at its top, and an inner or internal cylinder 2, also open at its top and preferably secured at its lower end to the base of the outer cylinder. The space between these cylinders forms a water-space 3, the object of which will be hereinafter explained. Within the inner or internal cylinder 2 is located a series of carbid-receptacles 4, each of which is preferably cylindrical in form and provided centrally with a hub 5, having a central bore 6, and divided into a series of compartments 7 by the radial partitions 8, as shown in Fig. 2 of the drawings. Each receptacle is provided with a series of water-inlet openings 9 and a series of gas-escape openings 10, a set of each series of openings being in communication with each compartment contained in each of said receptacles. The water-inlet openings 9 are arranged in spiral form and extend from the bottom of each receptacle to a point near its top, while the gas-escape openings are located at a point slightly below the top of each of said receptacles. When these carbid-receptacles are in position within cylinder 2, as shown in Fig. 1, the bores 6 of hubs 5 aline with one another and form a continuous passage-way from the bottom of cylinder 2 to the top of the uppermost carbid-receptacle, and as the carbid-receptacles are of less diameter than the inner cylinder 2 a water-space is also formed between the outer walls of said receptacles and the cylinder 2.

The carbid-receptacles are supported on a tank 11, located in the bottom of the cylinder 2, and this tank forms a gas or vacuum chamber 12, with which a vertical pipe 13 communicates. The pipe 13 extends up through the carbid-receptacles and terminates in the chamber 15, above the same, the upper end of said pipe being provided with a cap or hood 16 to prevent the passage of condensed moisture downwardly through it. The gas or vacuum chamber 12 is provided with a cock 17, by means of which to drain said chamber, and a similar cock 18 communicates with the interior of the cylinder 2, containing the carbid-receptacles, for draining water therefrom when desired.

A cylinder 19, closed at its top to form the gas-chamber 15 and open at its bottom, encircles the cylinder 2 and extends well down into the water-space 3, formed between the cylinders 1 and 2, said cylinder 19 being held against movement by means of a hook or hooks 20.

The cylinder 1 is provided exteriorly at its upper end with an annular trough 21, adapted to communicate through perforations 22 with the water-space 3, the purpose of said trough being to receive a supply of water from the space 3, and thus prevent the irregular gas-pressure from blowing out and losing the contents of the generator. With this arrangement when the accumulation of gas in the chamber 15 is sudden and exceeds the capacity of the discharge-pipe to carry it off considerable pressure will occur within said chamber 15 and tend to raise the cylinder 19; but as said cylinder is secured by means of the hooks 20 the excess of pressure thus created will come upon the water in the space 3, which constitutes a seal for the cylinder 19. When pressure is thus created on the water in space 3, a portion of it will flow into the annular trough 21, and thus danger from excessive pressure within the chamber 15 of cylinder 19 will be averted. As the excessive pressure within the chamber decreases the water in the trough 21 will recede and again enter the space 3.

The generator is preferably provided with one or more indicators 23 to denote that the carbid therein has been subjected to water without opening the carbid-chamber, which would cause a great loss of gas. The indicator 23 is constructed of telescoping thimbles having a wire 24 secured to the upper thimble and extending down into a compartment of a carbid-receptacle, so as to rest on the calcium carbid. As the carbid becomes consumed the wire and the thimble 23, to which it is secured, will descend, and thus denote that the carbid has been subjected to water.

The cylinder 19 may be provided with a handle 25 to facilitate its removal when it is desired to renew the carbid-receptacles.

A large pipe 26 communicates at one end with the gas or vacuum chamber 12 in the bottom of the generator A and at the other end with a coupling 27 in the bottom of the receiver B, said pipe being provided intermediate of its ends with a valve 28. A vertical pipe 29 communicates at its lower end with the coupling 27 and extends upwardly within the inverted telescoping cylinder 30 of the receiver, the upper end of said pipe 29 terminating above the water-line 31 in said receiver. Gas generated in the carbid-receptacles will escape to the chamber 15 in cylinder 19, from which it will pass down the pipe 13 to the gas or vacuum chamber 12 in the bottom of the generator, from which it will pass through the large pipes 26 29 into the chamber 32 above the water-line in the cylinder 30. From the chamber 32 of the receiver the gas will pass down through a pipe 33 and out through pipes 34 35 to place of consumption. The coupling 36 between the pipe 33 and 34 may be secured to or made integral with the coupling 27, and a small hole 37 is made in the couplings for the passage of any moisture which may accumulate in the outlet-pipe 33 into the pipe 26, by which it will be conveyed into the chamber 12, and from which latter the accumulated moisture can be drained through the cock, as before explained. In order to reduce the accumulation of moisture in the outlet-pipe to a minimum, a hood $33^a$ is placed over the same.

The pipes 26 29 are preferably several times larger in diameter than the outlet-pipe 33 and serve the purpose of relieving the generation of excessive pressure in quick generation of gas. It has been found from experience that it is important to have a large orifice or pipe leading from the generator into the receiver to make the machine of great capacity with small dimensions.

A float 38 is located in the receiver and may be made either conical in form, as shown in Figs. 1 and 6, or cylindrical, as shown in Fig. 7. The float 38 is provided with a dipper or cup chamber 39 at its top, which constitutes a reservoir to contain a supply of water to increase the capacity of the apparatus for the generation of gas. In other words, the cup or reservoir 39 on the float is intended to contain an amount of water sufficient for the generation of enough gas to fill the receiver to the desired maximum extent. The cup or reservoir on the float is connected by means of a flexible pipe 40 with a stand-pipe 41, the upper end of which terminates above the water-line in the receiver. The lower end of the pipe 40 communicates, by means of a pipe 42, with the bottom of the cylinder 2 of the generator, and in said pipe a valve 43 is located.

A rod 44 depends from the float 38 and enters a tube $44^a$, secured in the bottom of the receiver, said rod and tube serving to guide the float in its vertical movements and retain it at all times in proper upright position.

A rod 45 projects upwardly above the float (which rod may be an upward extension of the rod 44) and adapted to be engaged by the top of cylinder 30 when the gas in said cylinder has become exhausted, (or nearly so,) whereby to depress the float and refill the cup or reservoir 39 on said float.

The outer or stationary cylinder $30^a$ of the receiver is provided at its upper end with a reservoir 49 for holding a supply of water to compensate for that fed to the carbid-receptacle. The inner wall of reservoir 49, or rather the body portion of cylinder $30^a$, is provided near the bottom of said reservoir with a series of holes 50, through which water from the reservoir is fed to the receiver.

The cylinder 30 is provided with handles 46, by means of which to remove said cylinder from the outer cylinder $30^a$ when desired. A cock $46^a$ communicates with the top of cylinder 30, whereby to exhaust air therefrom before it is charged with gas. The various pipes in the receiver, as well as their couplings, are mounted on a base-plate 47, located in the bottom of the receiver, and the receiver and generator are located in a common base 48.

Having fully described my invention, what I claim as new, and desire to secure by Letters Patent, is—

1. In an acetylene-gas apparatus, the combination with a generator having a closed gas-tank under the carbid-receptacles and adapted to receive gas generated in the latter, and a drain-cock for said tank, of a receiver, a pipe connecting the gas-tank in the bottom of the generator with said receiver, a discharge-pipe for the receiver said pipes having limited communication with each other whereby moisture will flow from the discharge-pipe to the gas-tank in the bottom of the generator, substantially as set forth.

2. In an acetylene-gas apparatus, the combination with a generator, a receiver containing water and a pipe communicating with said generator and receiver, a float in the receiver, said float having a water-reservoir communicating with said pipe, substantially as set forth.

3. In an acetylene-gas apparatus, the combination with a generator, a receiver adapted to contain water and a pipe communicating with said generator and receiver, of a float in said receiver, a cup or reservoir on said float, a flexible pipe connecting said first-mentioned pipe with the cup or reservoir on the float and a rod projecting upwardly from said float and adapted to be engaged by the movable cylinder of the receiver.

4. In an acetylene-gas apparatus the combination with a generator and a receiver comprising telescoping cylinders and adapted to contain water, of a pipe connecting said generator and receiver, a float having a water-reservoir communicating with said pipe, a rod projecting upwardly from said float to be engaged by the movable cylinder of the receiver, a guide-rod depending from said float and a tube to receive said guide-rod, substantially as set forth.

5. In an acetylene-gas apparatus, the combination with a base or support, of a generator and a receiver mounted on said base or support, a base-plate located within the receiver, water and gas pipes connecting the generator and receiver, couplings for said pipes on the base-plate within the receiver and a cock for each pipe intermediate the generator and receiver, substantially as set forth.

In testimony whereof I have signed this specification in the presence of two subscribing witnesses.

JAMES J. FAULKNER.

Witnesses:
M. T. STEINBRECHER,
J. PUHEY.